United States Patent
Virgil, Jr.

(10) Patent No.: US 6,261,662 B1
(45) Date of Patent: Jul. 17, 2001

(54) MOLDED ELEMENT CONTAINING A HORIZONTALLY DISPOSED BORE

(75) Inventor: Hall Virgil, Jr., Brownsburg, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 08/238,681

(22) Filed: May 2, 1994

(51) Int. Cl.[7] .................................................. B32B 7/00
(52) U.S. Cl. ........................ 428/119; 425/468; 425/577; 428/120; 428/131; 428/137; 428/163; 428/167; 428/213; 428/220
(58) Field of Search .................................. 428/119, 120, 428/131, 137, 163, 167, 220, 213; 425/577, 468, DIG. 58; 249/64; 4/236, 240, 237

(56) References Cited

U.S. PATENT DOCUMENTS

| | | | | |
|---|---|---|---|---|
| 4,514,356 | * | 4/1985 | Harrison | 425/577 |
| 4,729,863 | * | 3/1988 | Muller | 425/577 |
| 5,122,052 | * | 6/1992 | Trame | 425/577 |

* cited by examiner

*Primary Examiner*—Nasser Ahmad

(57) ABSTRACT

In a molded element containing therein a horizontally disposed bore, the improvement comprising: a plurality of downwardly disposed first elements having distal ends, and being spaced apart from one another, and a plurality of upwardly disposed second elements having distal ends and being spaced apart from one another, wherein the plurality of first elements are offset from the plurality of second elements, whereby a horizontally disposed bore is formed by the distal ends of the plurality of first elements and the distal ends of the plurality of second elements.

8 Claims, 2 Drawing Sheets

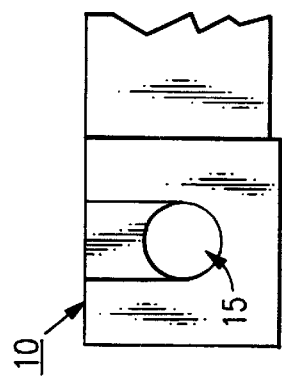
FIG. 1d
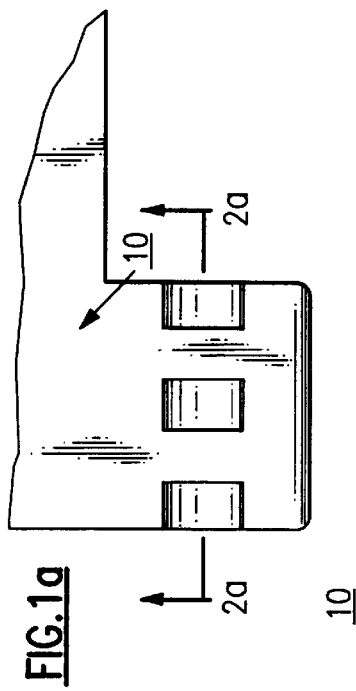
FIG. 1a
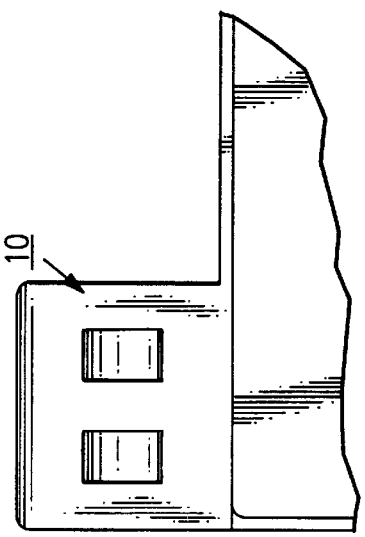
FIG. 1c
FIG. 1e
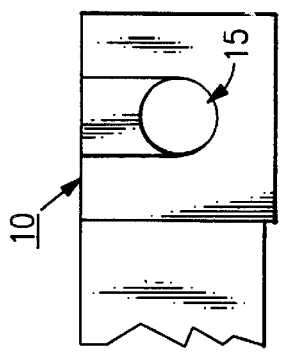
FIG. 1b

MOLDED ELEMENT CONTAINING A HORIZONTALLY DISPOSED BORE

BACKGROUND OF THE INVENTION

1. Field of the Invention

This invention relates to a molded element and more particularly to a molded element containing a horizontally disposed bore therein.

2. Description of the Prior Art

In the manufacture of molded articles, such as articles molded of plastic, cast metal, or the like, it is often the case that the article of manufacture is intended to be attached to or have attached thereto a second article. When the second article is to be joined above or below the molded article, and the mold segments are opened in a direction parallel to the desired bore (that is in an up-down direction), the molding process is uncomplicated. It is only necessary to provide a core in the location where the bore is needed and normal operation of the mold is sufficient to produce the desired result.

When, however, the article of manufacture is intended to attach or be attached to a second article alongside it and the bore has to be perpendicular to the direction of opening of the mold segments, the process becomes more complicated. A bore can be cut into the article in a separate process after it is removed from the mold. This process obviously requires extra time and careful alignment and/or special equipment. In the alternative, the mold can be composed of more than two separate pieces so that different parts thereof can be removed in different directions. This requires extra expenditure both in mold construction and in mold operation. As another alternative, in order to obviate the necessity of the mold needing to open in a direction other than parallel to the movement of the machine platen, other mechanical movement is used in conjunction with the movement of the mold. This involves side actions, side coring, cams, pullers, collapsing cores, loose cores and the like. This too requires significant extra cost in mold construction and results in a longer molding cycle and, concomitantly, less throughput.

The instant invention provides a simple form of bore appropriate for use with pins, screws and the like, that can be created using a mold that opens completely in the direction perpendicular to the machine paten and without other mechanical motion being required.

SUMMARY OF THE INVENTION

It is therefore a primary object of the present invention to provide a molded element containing a horizontally disposed bore.

It is a further object of the present invention to provide a molded element containing a horizontally disposed bore that can be produced using a mold that opens exclusively in directions perpendicular to the machine paten.

It is still a further object of the present invention to provide a molded element containing a horizontally disposed bore that can be produced without mechanical motion other than that of the mold segments in the direction of the movement of the machine paten being required.

It is yet a further object of the present invention to provide a molded element containing a horizontally disposed bore where the bore is delineated by alternating upwardly and downwardly disposed elements.

These and other objects of the present invention are attained by, in a molded element containing therein a horizontally disposed bore, the improvement comprising: a plurality of downwardly disposed first elements having distal ends, and being spaced apart from one another, and a plurality of upwardly disposed second elements having distal ends and being spaced apart from one another, wherein the plurality of first elements are offset from the plurality of second elements, whereby a horizontally disposed bore is formed by the distal ends of the plurality of first elements and the distal ends of the plurality of second elements.

According to one aspect of this invention, a molded element containing therein a horizontally disposed bore, has a plurality of downwardly disposed first elements spaced apart from one another and a plurality of upwardly disposed second elements spaced apart from one another. The plurality of first elements are offset from the plurality of second elements whereby a horizontally disposed bore is formed by the distal ends of the plurality of first elements and the distal ends of the plurality of second elements.

According to another aspect of this invention, the plurality of first elements and the plurality of second elements are flattened and elongated in shape and located parallel to one another in spaced-apart planes.

In accordance with another aspect of this invention the distal ends of the plurality of first elements and the plurality of second elements are outwardly arcuate, delimiting a cylindrical bore.

In accordance with still another aspect of this invention the plurality of first elements each have a first width and are spaced apart by a first distance and the plurality of second elements each have a second width and are spaced apart by a second distance and the first width is less than the second distance and the second width is less than the first distance.

In yet another aspect of this invention the plurality of first elements each have a first width and are spaced apart by a first distance and the plurality of second elements each have a second width and are spaced apart by a second distance and the first width is substantially equal to the second distance and the second width is substantially equal to the first distance.

According to still another aspect of this invention the first width is substantially equal to the second width.

In accordance with another aspect of this invention there are two downwardly disposed elements and three upwardly disposed elements of the molded element.

In yet another aspect of this invention mold for producing a molded element containing therein a horizontally disposed bore, the improvement contains an upper portion containing a plurality of downwardly disposed elements, spaced apart in parallel planes and having arcuate distal ends, and a lower portion containing a plurality of upwardly disposed elements, spaced apart in parallel planes and having arcuate distal ends. The lower portion and the upper portion are aligned so that upon closing the mold, the upwardly disposed elements and the downwardly disposed elements are located in alternating planes, and the arcuate ends of the upwardly disposed elements and the arcuate ends of the downwardly disposed elements define the horizontally disposed bore.

BRIEF DESCRIPTION OF THE DRAWINGS

For a better understanding of these and other objects of the present invention, reference is made to the detailed description of the invention which is to be read in conjunction with the following drawings, wherein:

FIG. 1a is a top plan view of the bore of an embodiment in accordance with the instant invention.

FIG. 1b is a left side view of the embodiment of FIG. 1a.

FIG. 1c is a front view of the embodiment of FIG. 1a.

FIG. 1d is a right side view of the embodiment of FIG. 1a.

FIG. 1e is a bottom view of the embodiment of FIG. 1a.

FIG. 2a is a sectional perspective view of the embodiment of FIG. 1a taken along line 2a—2a.

DETAILED DESCRIPTION OF THE INVENTION

Figure 2B:
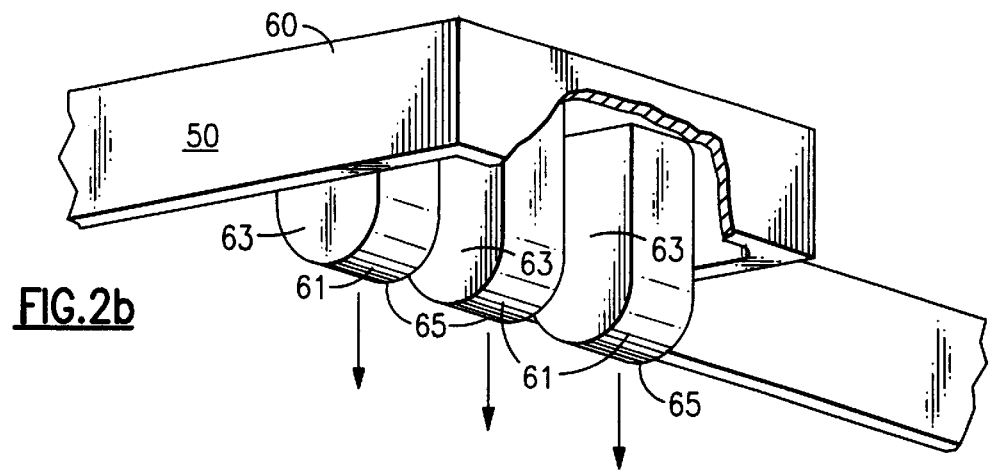
FIG. 2b is a perspective view of the top half of the mold for making the bore of the instant invention.
Figure 2A:
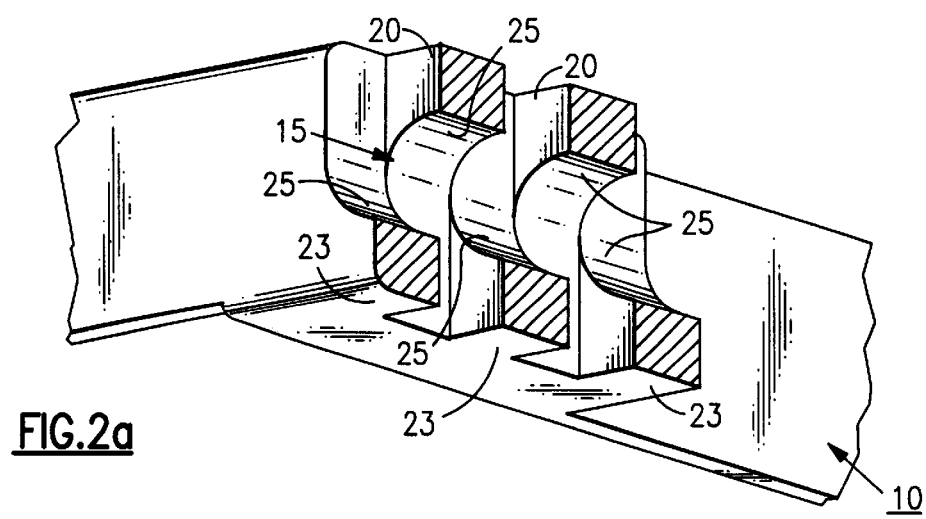
Figure 2C:
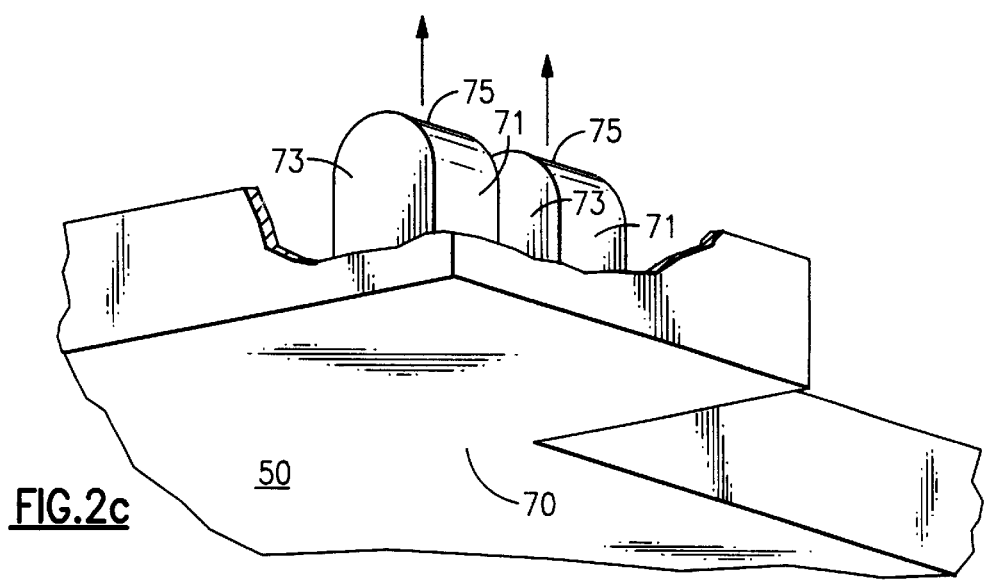
FIG. 2c is a perspective view of the bottom half of the mold for making the bore of the instant invention.

Turning now to the Drawing and particularly, FIGS. 1a–1e thereof there can be seen a molded element of plastic, cast metal or the like, containing a bore 15, the object generally being designated as 10. The bore 15 is produced in object 10 so that the bore 15 is perpendicular to the direction of opening of the mold segments which in this case is up and down as shown by the arrows in FIGS. 2a–2c.

The bore 15 is delimited by five elements, two of which are downwardly disposed 20 and three of which are upwardly disposed 23. Each grouping of elements, whether downwardly disposed or upwardly disposed, comprises a plurality of flat elongated elements which are located parallel to one another in spaced-apart planes. The distal end 25 of each element is outwardly arcuate in shape so that it rests snugly against a cylindrical screw or pin (not shown) that is inserted through the bore. Depending upon the length of bore desired and upon the identity and dimensions of the piece of hardware which will be inserted through the bore 15, the number of downwardly disposed elements 23 and upwardly disposed elements 20 may vary, as may their widths/thickness and the distance between pairs of elements. If the widths of the elements 23 and 20 are substantially equal to the distances between them, a continuous bore 15 is formed in the molded element 10. If, on the other hand, the widths of elements 23 and 20 is less than the distances between elements 23 and 20, then the bore is interrupted by a membrane between adjacent upwardly disposed elements 20 and downwardly disposed element 23, through which a sheet metal screw, barbed fastener, or the like can be driven. This configuration also provides some degree of resistance to fluid leakage through the bore. It is also possible to have the distal ends 25 of the elements differently shaped so as to accommodate different shaped pins (not shown) being inserted into the bore 15.

The mold 50 that produces this element is comprised of two portions, a top portion 60 and a bottom portion 70. Top portion 60 contains three downwardly disposed segments 61, 61, 61 each of which has flat sides 63, 63 parallel to one another and lying in stacked planes, and each of which has an arcuate distal end 65. Bottom portion 70, similarly contains two upwardly disposed segments 71, 71 each of which has flat sides 73, 73 parallel to one another and lying in stacked planes, and each of which has an arcuate distal end 75. The top portion 60 and bottom portion 70 are set so that when the mold 50 is closed, segments 61, 61, 61 lie in alternate planes to segments 71, 71 with their respective arcuate ends overlapping so that a bore 15 is formed by the elements which harden therebetween during the production process.

It is clearly seen that the core of a mold that is used to produce an item according to this invention, will be cleanly removed from the object 10 when the mold is removed by having its segments moved in a direction perpendicular to the bore.

While this invention has been explained with reference to the structure disclosed herein, it is not confined to the details set forth and this application is intended to cover any modifications and changes as may come within the scope of the following claims:

What is claimed is:

1. In a molded element containing therein a horizontally disposed bore for receiving a fastener therein, the improvement comprising:

a plurality of downwardly disposed first elements having distal ends, said plurality of first elements being spaced apart from one another; and a plurality of upwardly disposed second elements having distal ends, said plurality of second elements being spaced apart from one another;

wherein said plurality of first elements are offset from said plurality of second elements;

wherein said distal ends of said plurality of first elements and said distal ends of said plurality of second elements are outwardly accurate and combine to form a horizontally disposed cylindrical bore having at least one end open for receiving a threaded fastener therein.

2. The element according to claim 1 wherein said plurality of first elements and said plurality of second elements are flattened and elongated in shape and located parallel to one another in spaced-apart planes.

3. The element according to claim 1 wherein said plurality of first elements each have a first width and are spaced apart by a first distance and said plurality of second elements each have a second width and are spaced apart by a second distance and said first width is less than said second distance and said second width is less than said first distance.

4. The element according to claim 1 wherein said plurality of first elements each have a first width and are spaced apart by a first distance and said plurality of second elements each have a second width and are spaced apart by a second distance and said first width is substantially equal to said second distance and said second width is substantially equal to said first distance.

5. The element according to claim 4 wherein said first width is substantially equal to said second width.

6. The element according to claim 1 wherein said plurality of first elements consists of two elements and said plurality of second elements consists of three elements.

7. The element according to claim 1 wherein said element is fabricated from material selected from the group consisting of plastic and cast metal.

8. In a mold for producing a molded element containing therein a horizontally disposed bore for receiving a threaded fastener therein, the improvement comprising:

an upper portion containing a plurality of downwardly disposed elements, said downwardly disposed elements being spaced apart in parallel planes and having arcuate distal ends; and a lower portion containing a plurality of upwardly disposed elements, said upwardly disposed elements being spaced apart in parallel planes and having arcuate distal ends, wherein said lower portion and said upper portion are aligned so that upon closing the mold, said upwardly disposed elements and said downwardly disposed elements are located in alternating planes, and the arcuate ends of said upwardly disposed elements and the arcuate ends of said downwardly disposed elements define a horizontally disposed cylindrical bore having an opening in at least one end thereof for receiving a threaded fastener therein.

* * * * *